United States Patent
Gohil et al.

(10) Patent No.: US 11,604,897 B1
(45) Date of Patent: Mar. 14, 2023

(54) DATA PRIVACY PROTECTION SYSTEM AND METHOD

(71) Applicant: T-MOBILE INNOVATIONS LLC, Overland Park, KS (US)

(72) Inventors: Jaideepsinh Gohil, Overland Park, KS (US); Bobby Williams, Prairie Village, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 195 days.

(21) Appl. No.: 17/147,421

(22) Filed: Jan. 12, 2021

(51) Int. Cl.
| | |
|---|---|
| *G06F 21/62* | (2013.01) |
| *G06F 21/64* | (2013.01) |
| *G06F 16/23* | (2019.01) |
| *G06F 16/22* | (2019.01) |
| *G06F 21/60* | (2013.01) |

(52) U.S. Cl.
CPC ...... *G06F 21/6254* (2013.01); *G06F 16/2282* (2019.01); *G06F 16/23* (2019.01); *G06F 21/602* (2013.01); *G06F 21/64* (2013.01)

(58) Field of Classification Search
CPC .. G06F 21/6254; G06F 16/2282; G06F 16/23; G06F 21/602; G06F 21/64
See application file for complete search history.

(56) References Cited

U.S. PATENT DOCUMENTS

| | | | | |
|---|---|---|---|---|
| 9,910,902 | B1* | 3/2018 | Kramer | G06Q 50/01 |
| 2003/0014654 | A1* | 1/2003 | Adler | G06F 21/6245 |
| | | | | 726/1 |
| 2008/0147554 | A1* | 6/2008 | Stevens | G16H 10/60 |
| | | | | 705/51 |
| 2013/0332987 | A1* | 12/2013 | Tenneti | G06F 21/10 |
| | | | | 726/4 |
| 2014/0122684 | A1* | 5/2014 | Brentano | G06F 21/316 |
| | | | | 709/223 |
| 2015/0149362 | A1* | 5/2015 | Baum | G06F 21/602 |
| | | | | 705/51 |
| 2016/0142379 | A1* | 5/2016 | Tawakol | H04L 63/0421 |
| | | | | 726/1 |
| 2017/0364700 | A1* | 12/2017 | Goldfarb | H04L 9/3247 |
| 2019/0026492 | A1* | 1/2019 | Sandholm | H04L 9/0643 |

* cited by examiner

*Primary Examiner* — Michael R Vaughan
*Assistant Examiner* — Ethan V Vo (57) ABSTRACT

A data privacy protection system is disclosed that comprises listener(s) that receive and store data including non-personal identifiable information (PII) and PII in data sets in a database and agent(s) that access each data set from the database, obtain the non-PII data and exclude the PII data to create non-PII data sets, and transmit the non-PII data sets to a third-party server. The system further comprises an anonymization framework that obtains the PII data from the data sets and stores some of the PII data in a raw PII data set. The anonymization framework distributes anonymization work on the stored PII data to queues based on hashed device identifiers associated with the stored PII data, performs the anonymization work on the stored PII data according to the queues to create an anonymized PII data set, and transmits the anonymized PII data set to the third-party server.

17 Claims, 5 Drawing Sheets

DATA PRIVACY PROTECTION SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Corporations are often tasked with protecting personally identifiable information (PII). PII is data that could potentially be used to identify a particular person. Examples of PII may include a name, social security number, address, driver's license number, bank account number, passport number, and email address. In contrast, non-PII is data that cannot be used on its own to identify a particular person.

SUMMARY

In an embodiment, a data privacy protection system is disclosed. The system comprises a plurality of data sources that provide data to a landing zone. The data comprises non-personal identifiable information (PII) and PII and is stored as data files in the landing zone. The system also comprises one or more listeners stored in a non-transitory memory that, when executed by a processor, receive the data from the data files and store the data in a plurality of data sets in a database. The system additionally comprises one or more agents stored in a non-transitory memory that, when executed by a processor, access each of the data sets from the database, obtain the non-PII data and exclude the PII data from each of the data sets to create a plurality of non-PII data sets, and transmit the non-PII data sets to a third-party server. The system further comprises an anonymization framework stored in a non-transitory memory that, when executed by a processor, obtains the PII data from the data sets and stores at least some of the PII data in a raw PII data set. The stored PII data is associated with a plurality of device identifiers. The anonymization framework also applies a hashing algorithm to each of the device identifiers, distributes anonymization work on the stored PII data to a plurality of queues based on the hashed device identifiers, and performs the anonymization work on the stored PII data according to the queues to create an anonymized PII data set. The anonymization work comprises applying a one-way hashing algorithm to the stored PII data. The anonymization framework further transmits the anonymized PII data set to the third-party server.

In another embodiment, a data privacy protection method is disclosed. The method comprises providing, by a plurality of data sources, data to a landing zone. The data comprises non-personal identifiable information (PII) and PII and is stored as data files in the landing zone. The method also comprises receiving and storing, by one or more listeners stored in a non-transitory memory and executable by a processor, the data from the data files in a plurality of data sets in a database. The method additionally comprises accessing, by one or more agents stored in a non-transitory memory and executable by a processor, each of the data sets from the database, obtaining, by the one or more agents, the non-PII data and excluding, by the one or more agents, the PII data from each of the data sets to create a plurality of non-PII data sets, and transmitting, by the one or more agents, the non-PII data sets to a third-party server. The method also comprises obtaining, by an anonymization framework stored in a non-transitory memory and executable by a processor, the PII data from the data sets and storing, by the anonymization framework, at least some of the PII data in a raw PII data set. The stored PII data is associated with a plurality of device identifiers. The method further comprises applying, by the anonymization framework, a hashing algorithm to each of the device identifiers, distributing, by the anonymization framework, anonymization work on the stored PII data to a plurality of queues based on the hashed device identifiers, and performing, by the anonymization framework, the anonymization work on the stored PII data according to the queues to create an anonymized PII data set. The anonymization work comprises applying a one-way hashing algorithm to the stored PII data. The method additionally comprises transmitting, by the anonymization framework, the anonymized PII data set to the third-party server.

In yet another embodiment, a data privacy protection system is disclosed. The system comprises a plurality of data sources that provide data to a landing zone. The data comprises non-personal identifiable information (PII) and PII and is stored as data files in the landing zone. The system also comprises one or more listeners stored in a non-transitory memory that, when executed by a processor, receive the data from the data files and store the data in a plurality of data sets in a database. The system additionally comprises one or more agents stored in a non-transitory memory that, when executed by a processor, access each of the data sets from the database, obtain the non-PII data and exclude the PII data from each of the data sets to create a plurality of non-PII data sets, and transmit the non-PII data sets to a third-party server. The system further comprises an anonymization framework stored in a non-transitory memory that, when executed by a processor, obtains the PII data from the data sets and applies one or more filters from one or more sticky tables to the PII data to create filtered PII data. Each sticky table is periodically updated with updated filter data by merging the updated filter data with existing filter data in the sticky table. The anonymization framework also applies a one-way hashing algorithm to the filtered PII data to create an anonymized PII data set and transmits the anonymized PII data set to the third-party server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Data containing personally identifiable information (PII) is restricted from being shared by wireless telecommunication carriers with third parties. Wireless telecommunication carriers are willing to provide data that has PII mixed into it for the overall benefits of profiles and analytics provided that its customers privacy can be appropriately protected and the work can be done efficiently given the massive amounts of flowing data. The pending application is directed to a data privacy protection system that provides a technical solution to sharing data that initially has PII data mixed into it outside of the boundary of the wireless telecommunication carrier, such as to a third party, in such a way that protects the PII of the wireless telecommunication carrier's customers. Further, given the large amount of flowing data, the data privacy protection system disclosed herein performs the work to protect the PII of the wireless telecommunication carrier's customers in an efficient manner.

The data privacy protection system disclosed herein includes an architectural approach that helps balance efficiency of processing data and the protection of privacy. In particular, the data privacy protection system may include a landing zone for PII and non-PII data from data sources, listeners that register to receive specific kinds of information from the landing zone and store the data in a tables in a database, agents that process such tables, and an anonymization framework that anonymizes the PII data from the tables. The agents may process the separate tables of data harvested on an on-going basis from subscribers and their communication devices and groom out the PII data. For most tables that include both non-PII data and PII data, for each table entry, the associated agent excludes all PII data, generates an index based on a subscriber identification (hereinafter "subscriber ID"), and creates a derived, groomed table comprising entries with non-PII data and the index. A subscriber ID is a distinctive string of numbers and/or letters that is associated with and identifies a particular subscriber. The index may be determined by first performing an MD5 hash of the subscriber ID, concatenating that MD5 hash with a rotating salt, performing a SHA256 hash of the concatenation, and then performing an MD5 hash of the hashed concatenation. The salt may change periodically, for example every 7 days or some other interval. This rotation of the salt effectively prevents associating data shared related to a single subscriber for more than the period of salt rotation (e.g., for more than 7 days). Because each different groomed table calculates the index from the subscriber ID and rotating salt in the same way, entries associated with the same subscriber ID in different tables can be associated through the indexes.

A separate anonymized PII table is formed by the anonymization framework of the data privacy protection system that includes the PII data excluded from the non-PII data tables. The anonymization framework may comprise one or more sticky tables, which include one or more filters to be applied to the PII data to exclude certain PII data from the anonymized PII table. For example, the anonymization framework may include a sticky table for student or minor exclusions and one or more other sticky tables for opt outs, corporate liable exclusions, and/or government exclusions. The filters from the student or minor exclusions sticky table may be applied at a first stage (e.g., prior to storing the PII data in a raw PII table) while the filters from the other sticky tables may be applied at a second stage (e.g., during the creation of the anonymized PII table after storing the PII data in the raw PII table).

In the past, exclusions were defined in a daily file used as an input by the anonymization framework to exclude data. However, a problem occurred when a failure led to the daily file identifying exclusions being empty, and consequently much data that should have been excluded from the anonymized PII table was not. The pending application addresses this problem through the use of the one or more sticky or persistent tables where updated filter data from the daily file is merged with existing filter data already in the sticky tables. Thus, if an empty file was delivered, all the exclusions in effect the day before would remain in effect on the day of the empty file. If someone who was previously opted out opts back in, this may be managed by a direct edit to the corresponding sticky table.

The raw PII data may be stored in a table. The anonymization processing of the raw PII data may be distributed to queues. Previously, distribution of the work was done based on a device identity (hereinafter "device ID"). A device ID is a distinctive string of numbers and/or letters that is associated with and identifies a particular mobile communication device. Since most device IDs begin with a leading '0', this led to a very skewed partition, when processed with a binary sort tree. For example, when using 100 queues, the distribution based on device ID resulted in 90% of the jobs being distributed to the 98th queue and to the 99th queue. Since it is a property of hashes that the numbers are evenly and randomly distributed across the whole range of valid hash values, the pending application addresses the uneven distribution problem by distributing work to queues based on a hash of the device ID.

The filtered raw PII data is hashed and stored in the anonymized PII table to protect the PII such that the sensitive data cannot be tracked back to a person. Each entry in the anonymized PII table may comprise obfuscated PII fields, an index field calculated in the same way as the index used in the groomed non-PII data tables, as well as a consistent hash of the subscriber ID. This consistent hash may be found by performing an MD5 hash of the subscriber ID, concatenating the subscriber ID and the hashed subscriber identity and an unchanging salt, and then determining the SHA256 hash of this concatenation. This consistent hash does not change over time. This consistent hash can be used to associate different entries in the anonymized PII data table(s) that have different index values (because they relate to data collected more than 7 days apart, for example), and thereby allow joining data in groomed non-PII data tables having different indexes (but indexes that associate to the same unchanging hash).

It is contemplated that the data shared from the wireless telecommunication carrier may be stored using Amazon web services (AWS) in C5 storage in the cloud. In some embodiments, the anonymized PII table described above may be fractioned into two tables as opposed to one: a first table having the index associated to the obfuscated PII data and a second table that has entries associating indexes to the unchanging hash value. This would allow for the transmission of the entries associating indexes to unchanging hash values with increased security to the cloud storage but using lower cost communication routines to store the rest of the data in the cloud. The tables may be separated out to individual executors per different subscriber, which makes joining of table entries faster.

Figure 1:
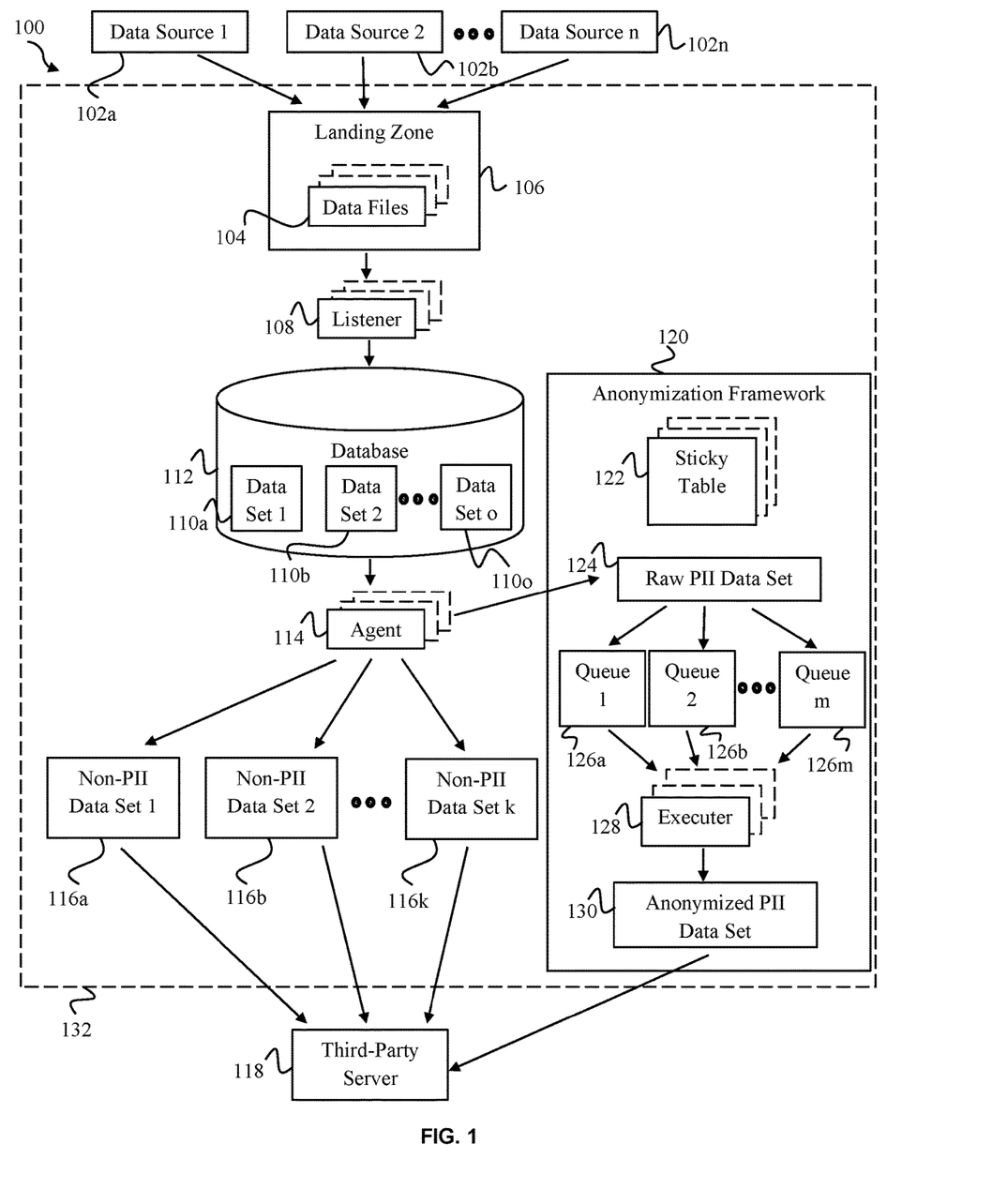
FIG. 1 is a block diagram of a data privacy protection system according to an embodiment of the disclosure.

Turning now to FIG. 1, a data privacy protection system 100 is disclosed. In an embodiment, the system 100 comprises a plurality of data sources 102a-102n, a landing zone 106, one or more listeners 108, a database 112, one or more agents 114, a third-party server 118, and an anonymization framework 120. In some contexts herein, the plurality of data sources 102a-102n may be referred to as the data sources 102. The data sources 102 may provide data to the landing zone 106 periodically. For example, the data sources 102 may provide data to the landing zone 106 daily or at some other interval. In an embodiment, the landing zone 106 comprises a non-transitory memory. The data provided by the data sources 102 may comprise demographic data, customer contacts data, location data, behavioral data, and/or other data. Further, the data provided by the data sources 102 may comprise non-PII data and PII data. The data provided by the data sources 102 may be stored as data files 104 in the landing zone 106.

The listeners 108 are executable artifacts, scripts, or programs. The listeners 108 may register to receive specific kinds of information. The one or more listeners 108 may receive the data from the data files 104 in the landing zone 106 and store the data in a plurality of data sets 110a-110o in the database 112. In some contexts herein, the plurality of data sets 110a-110o may be referred to as the data sets 110. The one or more agents 114 may access each of the data sets 110 from the database 112 and obtain the non-PII data and exclude the PII data from each of the data sets 110 to create a plurality of non-PII data sets 116a-116k. In some embodiments, there may be a one-to-one relationship between an agent 114 and a data set 110 such that one agent 114 processes the data from a corresponding data set 110. In some contexts herein, the plurality of non-PII data sets 116a-116k may be referred to as the non-PII data sets 116. The one or more agents 114 may transmit the non-PII data sets 116 to the third-party server 118. The data sets 110 and the non-PII data sets 116 will be discussed in more detail with reference to FIG. 2.

The agents 114 are executable artifacts, scripts, or programs. While the agents 114 are represented as outside of the anonymization framework 120, one or more of the agents 114 may be included within the anonymization framework 120. For example, one or more of the agents 114 may receive the excluded PII data from the data sets 110 and store at least some of that PII data in a raw PII data set 124. The anonymization framework 120 may comprise one or more sticky tables 122 that include one or more filters. The one or more filters may comprise a plurality of student or minor exclusions, aggregate reporting opt outs, corporate liable exclusions, government exclusions, and/or other exclusions. In an embodiment, the anonymization framework 120 comprises at least two sticky tables 122—a first sticky table that includes a plurality of student or minor exclusions and a second sticky table that includes at least one of aggregate reporting opt outs, corporate liable exclusions, government exclusions.

In the past, exclusions were defined in a daily file used as an input by the anonymization framework 120 to exclude data. However, a problem occurred when a failure led to the daily file identifying exclusions being empty, and consequently much data that should have been excluded from the anonymized PII table was not. The use of the one or more sticky or persistent tables 122 where updated filter data from the daily file is merged with existing filter data already in the sticky tables 122 addresses this problem. Thus, if an empty file were delivered, all the exclusions in effect the day before would remain in effect on the day of the empty file.

One or more agents 114 may apply one or more filters from one or more sticky tables 122 to the excluded PII data to create filtered PII data. The one or more filters may be applied at different stages. For example, a first filter may be applied prior to storing the PII data in the raw PII data set 124 while a second filter may be applied to the PII data stored in the raw PII data set 124. The one or more filters and the PII data may be associated with subscriber IDs such that the one or more filters may be applied to the PII data based on a subscriber ID. A subscriber ID is a distinctive string of numbers and/or letters that is associated with and identifies a particular subscriber.

The anonymization processing of the raw PII data from the raw PII data set 124 may be distributed to a plurality of queues 126a-126m. In some contexts herein, the plurality of data queues 126a-126m may be referred to as the queues 126. Previously, distribution of the work was done based on device ID. A device ID is a distinctive string of numbers and/or letters that is associated with and identifies a particular mobile communication device. Since most device IDs begin with a leading '0', this led to a very skewed partition, when processed with a binary sort tree. For example, when using 100 queues, the distribution based on device ID resulted in 90% of the jobs being distributed to the 98th queue and to the 99th queue. In an embodiment, to address the uneven distribution problem, work is distributed to the queues 126 based on a hash of the device ID such as an MD5 hash of the device ID. Distributing the anonymization work between the queues 126 based on a hash of the device ID results in a more even distribution of work between the queues 126.

The anonymization framework 120 may comprise one or more executers 128 that perform the anonymization on the raw data from the raw PII data set 124 according to the jobs in the queues 126 and store the anonymized PII data in an anonymized PII data set 130. The executers 128 are executable artifacts, scripts, or programs. The anonymization framework 120 may transmit the anonymized PII data set 130 to the third-party server 118. The raw PII data set 124 and the anonymized PII data set 130 will be discussed in more detail with reference to FIG. 2. The landing zone 106, the one or more listeners 108, the database 112, the one or more agents 114, and the anonymization framework 120 may be stored and/or executed on a computer system 132. Computer systems are discussed in more detail hereinafter.

Figure 2:
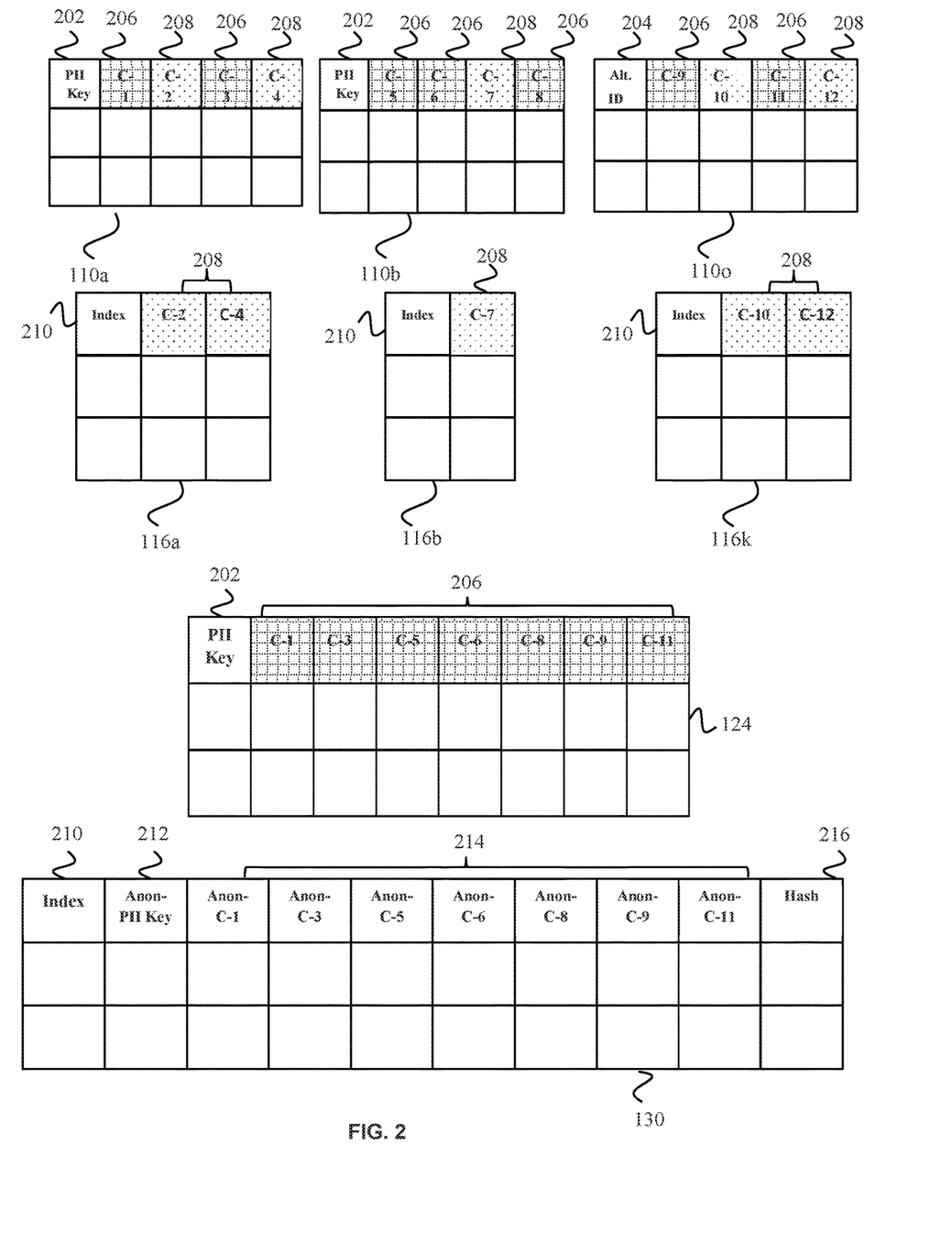
FIG. 2 illustrates exemplary data sets from the data privacy protection system in more detail according to an embodiment of the disclosure.

Turning now to FIG. 2, exemplary data sets from the data privacy protection system 100 are illustrated in more detail. In particular, the data sets 110, the non-PII data sets 116, the raw PII data set 124, and the anonymized PII data set 130 are illustrated in more detail. The data sets 110 received from the data sources 102 may comprise a PII key 202, PII data 206, and non-PII data 208. In an embodiment, the PII key 202 is a subscriber ID. In some cases, instead of the PII key 202, a data set 110, such as data set 110o, may comprise an alternative ID 204 such as an advertisement ID. In such an embodiment, the advertisement ID may be mapped to a corresponding subscriber ID.

The non-PII data sets 116 may comprise the non-PII data 208 and an index 210. For example, the non-PII data set 116a may comprise the non-PII data 208 from data set 110a and the index 210, the non-PII data set 116b may comprise the non-PII data 208 from data set 110b and the index 210, and the non-PII data set 116k may comprise the non-PII data 208 from data set 110o and the index 210. In an embodiment, the index 210 is determined by first performing an MD5 hash of the PII key 202, concatenating that MD5 hash with a rotating salt, performing a SHA256 hash of the concatenation, and then performing an MD5 hash of the hashed concatenation. The salt may change periodically, for example every 7 days or some other interval. This rotation of the salt effectively prevents associating data shared related to a single subscriber for more than the period of salt rotation (e.g., for more than 7 days). Because each different non-PII data set 116 calculates the index 210 from the subscriber ID and rotating salt in the same way, entries in different tables can be associated through the indexes 210.

The raw PII data set 124 may comprise at least some of the PII data 206 from the data sets 110 and the PII key 202. While all of the PII data 206 from the data sets 110 is illustrated in the raw PII data set 124 in FIG. 2, in some embodiments, one or more of the PII data 206 may be excluded based on application of one or more filters (e.g., one or more student or minor exclusions) from one of the sticky table 122.

The anonymized PII data set 130 may comprise the index 210, an anonymized PII key 212, anonymized PII data 214, and a hash 216. The index 210 may be calculated in the same way as the index 210 used in the non-PII data sets 116. For example, the index 210 may be determined by first performing an MD5 hash of the PII key 202 (e.g., the subscriber ID), concatenating that MD5 hash with a rotating salt, performing a SHA256 hash of the concatenation, and then performing an MD5 hash of the hashed concatenation.

A one-way hashing algorithm may be applied to the PII key 202 to create the anonymized PII key 212. For example, the anonymized PII key 212 may be found by performing an MD5 hash of the subscriber ID, concatenating the hashed subscriber ID and an unchanging salt, and then determining the SHA256 hash of this concatenation.

A one-way hashing algorithm may be applied to the PII data 206 to create the anonymized PII data 214 so as to protect the PII such that the sensitive data cannot be tracked back to a person. For example, the anonymized PII data 214 may be found by performing an MD5 hash of the PII data 206, concatenating that MD5 hash with a rotating salt, and then determining the SHA256 hash of this concatenation.

The hash 216 may be a consistent hash of the PII key 202 (e.g., a subscriber ID). The consistent hash 216 may be found by performing an MD5 hash of the subscriber ID, concatenating the subscriber ID and the hashed subscriber identity and an unchanging salt, and then determining the SHA256 hash of this concatenation. This consistent hash 216 does not change over time. This consistent hash 216 can be used to associate different entries in the anonymized PII data table(s) 130 that have different index values 210 (because they relate to data collected more than 7 days apart, for example), and thereby allow joining data in non-PII data sets 116 having different indexes 210 (but indexes that associate to the same unchanging hash 216).

While all of the PII data 206 from the data sets 110 is illustrated as anonymized and stored in the anonymized PII data set 130 in FIG. 2, in some embodiments, one or more of the PII data 206 may be excluded based on application of one or more filters (e.g., one or more of aggregate reporting opt outs, corporate liable exclusions, and/or government exclusions) from one of the sticky table 122. In some embodiments, the index 210, the anonymized PII key 212, the anonymized PII data 214, and the hash may be found using other hashing algorithms than the ones discussed above without departing from the spirt or scope of the present disclosure.

While illustrated and discussed above as a single anonymized PII data set 130, in an embodiment, the anonymized PII data set 130 may be fractioned into two tables as opposed to one. For example, there may be a first table having the index 210 associated to the anonymized PII key 212 and anonymized PII data 214 and a second table that has entries associating indexes 210 to the unchanging hashes 216. This would allow for the transmission of the entries associating indexes 210 to unchanging hash values 216 with increased security to the storage, such as cloud storage, but using lower cost communication routines to store the rest of the data (e.g., the anonymized PII key 212 and the anonymized PII data 214 from the first table) in the cloud.

Figure 3A:
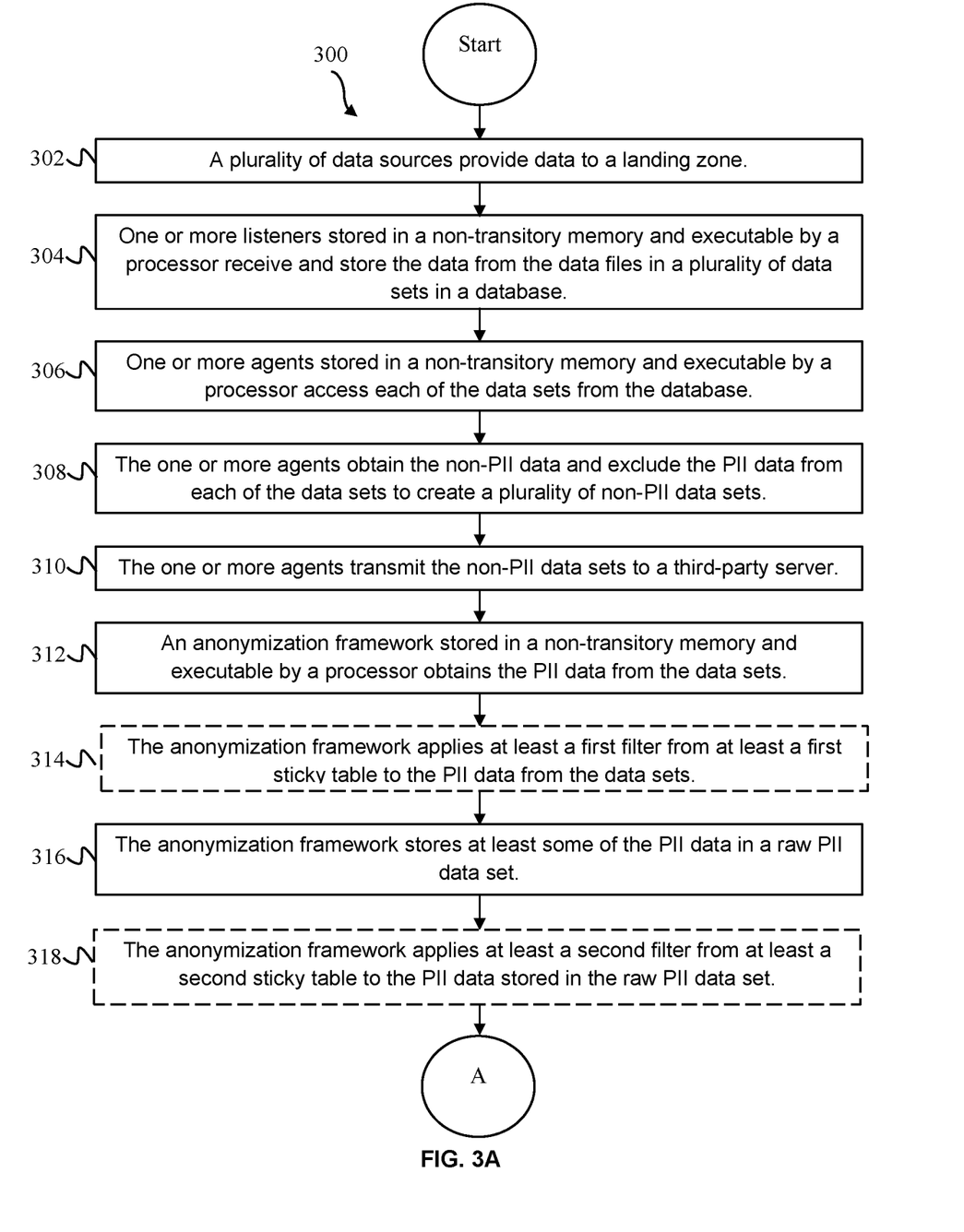
FIGS. 3A and 3B is a flow chart of a method according to an embodiment of the disclosure.
Figure 3B:
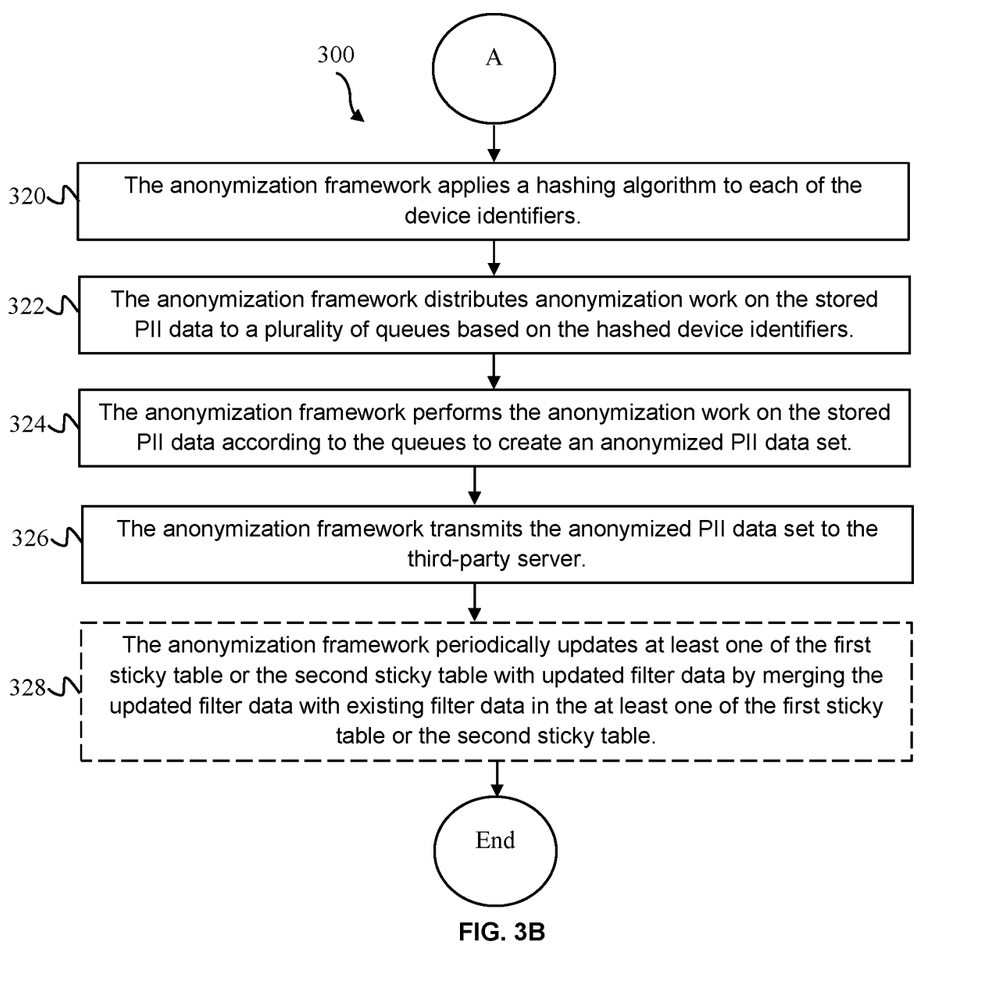

Turning now to FIGS. 3A and 3B, a data privacy protection method 300 is described. At block 302, a plurality of data sources (e.g., data sources 102) provide data to a landing zone (e.g., landing zone 106). At block 304, one or more listeners (e.g., one or more listeners 108) receive and store data from data files (e.g., data files 104) in a plurality of data sets (e.g., data sets 110) in a database (e.g., database 112). At block 306, one or more agents (e.g., agents 114) access each of the data sets from the database. At block 308, the one or more agents obtain the non-PII data and exclude the PII data from each of the data sets to create a plurality of non-PII data sets (e.g., non-PII data sets 116). At block 310, the one or more agents transit the non-PII data sets to a third-party server (e.g., third-party server 118).

At block 312, an anonymization framework (e.g., anonymization framework 120) obtains the PII data from the data sets. At optional block 314, the anonymization framework applies at least a first filter from at least a first sticky table (e.g., sticky table 122) to the PII data from the data sets. At block 316, the anonymization framework stores at least some of the PII data in a raw PII data set (e.g., raw PII data set 124). At optional block 318, the anonymization framework applies at least a second filter from at least a second sticky table (e.g., sticky table 122) to the PII data stored in the raw PII data set.

At block 320, the anonymization framework applies a hashing algorithm to each of the device identifiers. At block 322, the anonymization framework distributes anonymization work on the stored PII data to a plurality of queues (e.g., queues 126) based on the hashed device identifiers. At block 324, the anonymization framework performs the anonymization work on the stored PII data according to the queues to create an anonymized PII data set (e.g., anonymized PII data set 130). At block 326, the anonymization framework transmits the anonymized PII data set to the third-party server. At optional block 328, the anonymization framework periodically updates at least one of the first sticky table or the second sticky table with updated filter data by merging the updated filter data with existing filter data in the at least one of the first sticky table or the second sticky table.

Figure 4:
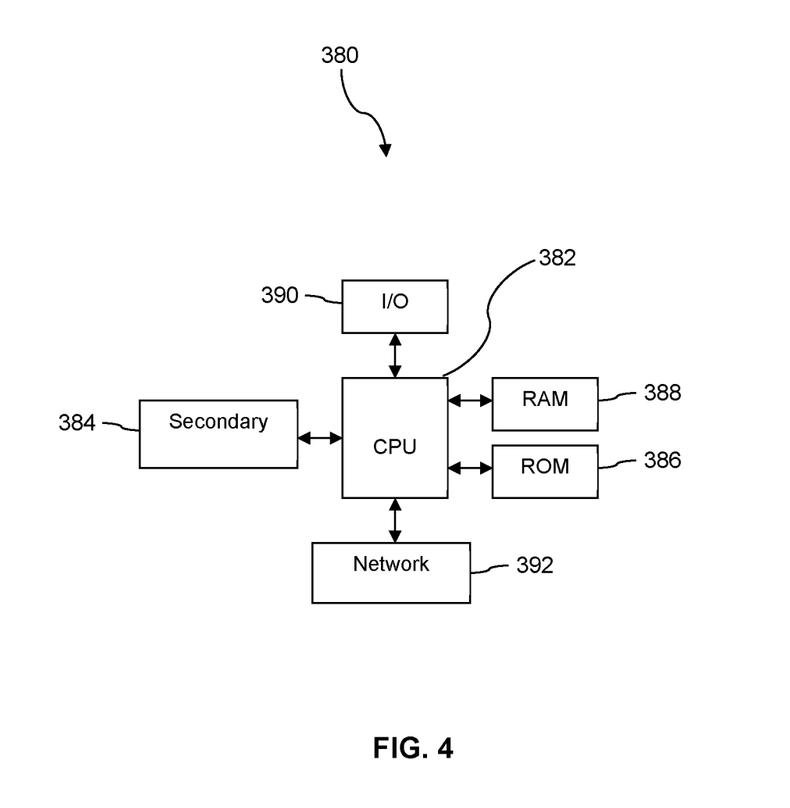
FIG. 4 is block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A data privacy protection system, comprising:
a plurality of data sources that provide data to a landing zone, wherein the data comprises non-personal identifiable information (PII) and PII and is stored as data files in the landing zone;
one or more listeners stored in a non-transitory memory that, when executed by a processor, receive the data from the data files and store the data in a plurality of data sets in a database;
one or more agents stored in a non-transitory memory that, when executed by a processor:
access each of the data sets from the database,
obtain the non-PII data and exclude the PII data from each of the data sets to create a plurality of non-PII data sets, and
transmit the non-PII data sets to a third-party server, wherein each entry in each of the non-PII data sets comprises an index based on a corresponding subscriber identification; and
an anonymization framework stored in a non-transitory memory that, when executed by a processor:

obtains the PII data from the data sets and stores at least some of the PII data in a raw PII data set, wherein the stored PII data is associated with a plurality of device identifiers, applies a hashing algorithm to each of the device identifiers, distributes anonymization work on the stored PII data to a plurality of queues based on the hashed device identifiers, performs the anonymization work on the stored PII data according to the queues to create an anonymized PII data set, wherein the anonymization work comprises applying a one-way hashing algorithm to the stored PII data, and transmits the anonymized PII data set to the third-party server independent of the non-PII data sets, wherein each entry in the anonymized PII data set comprises an index based on a corresponding subscriber identification, and wherein entries in the non-PII data sets and the anonymized PII data set are associated for a period of time by having a same index.

2. The system of claim 1, wherein the one-way hashing algorithm is applied with a rotating salt.

3. The system of claim 1, wherein the data from the one or more data sources comprises demographic data, customer contacts data, location data, and behavioral data.

4. The system of claim 1, further comprising one or more sticky tables stored in the non-transitory memory of the anonymization framework, wherein the one or more sticky tables comprises one or more filters, and wherein each sticky table is periodically updated with updated filter data by merging the updated filter data with existing filter data in the sticky table.

5. The system of claim 4, wherein the anonymization framework applies at least one filter from at least one sticky table to the PII data stored in the raw PII data set.

6. The system of claim 4, wherein the anonymization framework applies at least one filter from at least one sticky table to the PII data from the data sets prior to storing the at least some of the PII data in the raw PII data set.

7. The system of claim 4, wherein the one or more filters comprises one or more of student or minor exclusions, aggregate reporting opt outs, corporate liable exclusions, or government exclusions.

8. A data privacy protection method, comprising:
providing, by a plurality of data sources, data to a landing zone, wherein the data comprises non-personal identifiable information (PII) and PII and is stored as data files in the landing zone;

receiving and storing, by one or more listeners stored in a non-transitory memory and executable by a processor, the data from the data files in a plurality of data sets in a database;

accessing, by one or more agents stored in a non-transitory memory and executable by a processor, each of the data sets from the database;

obtaining, by the one or more agents, the non-PII data and excluding, by the one or more agents, the PII data from each of the data sets to create a plurality of non-PII data sets;

transmitting, by the one or more agents, the non-PII data sets to a third-party server, wherein each entry in each of the non-PII data sets comprises an index based on a corresponding subscriber identification;

obtaining, by an anonymization framework stored in a non-transitory memory and executable by a processor, the PII data from the data sets;

storing, by the anonymization framework, at least some of the PII data in a raw PII data set, wherein the stored PII data is associated with a plurality of device identifiers;

applying, by the anonymization framework, a hashing algorithm to each of the device identifiers;

distributing, by the anonymization framework, anonymization work on the stored PII data to a plurality of queues based on the hashed device identifiers;

performing, by the anonymization framework, the anonymization work on the stored PII data according to the queues to create an anonymized PII data set, wherein the anonymization work comprises applying a one-way hashing algorithm to the stored PII data; and transmitting, by the anonymization framework, the anonymized PII data set to the third-party server independent of the non-PII data sets, wherein each entry in the anonymized PII data set comprises an index based on a corresponding subscriber identification, and wherein entries in the non-PII data sets and the anonymized PII data set are associated for a period of time by having a same index.

9. The method of claim 8, wherein the one-way hashing algorithm is applied with a rotating salt.

10. The method of claim 8, wherein the data from the one or more data sources comprises demographic data, customer contacts data, location data, and behavioral data.

11. The method of claim 8, further comprising:
applying, by the anonymization framework, at least a first filter from at least a first sticky table to the PII data from the data sets prior to storing the at least some of the PII data in the raw PII data set; and applying, by the anonymization framework, at least a second filter from at least a second sticky table to the PII data stored in the raw PII data set.

12. The method of claim 11, further comprising periodically updating, by the anonymization framework, at least one of the first sticky table or the second sticky table with updated filter data by merging the updated filter data with existing filter data in the at least one of the first sticky table or the second sticky table.

13. A data privacy protection system, comprising:
a plurality of data sources that provide data to a landing zone, wherein the data comprises non-personal identifiable information (PII) and PII and is stored as data files in the landing zone;

one or more listeners stored in a non-transitory memory that, when executed by a processor, receive the data from the data files and store the data in a plurality of data sets in a database;

one or more agents stored in a non-transitory memory that, when executed by a processor:
access each of the data sets from the database,
obtain the non-PII data and exclude the PII data from each of the data sets to create a plurality of non-PII data sets, and
transmit the non-PII data sets to a third-party server, wherein each entry in each of the non-PII data sets comprises an index based on a corresponding subscriber identification; and an anonymization framework stored in a non-transitory memory that, when executed by a processor:
obtains the PII data from the data sets,
applies one or more filters from one or more sticky tables to the PII data to create filtered PII data, wherein each sticky table is periodically updated with updated filter data by merging the updated filter data with existing filter data in the sticky table, applies a one-way hashing algorithm to the filtered PII data to create an anonymized PII data set, and transmits the anonymized PII data set to the third-party server independent of the non-PII data sets, wherein each entry in the anonymized PII data set comprises an index based on a corresponding subscriber identification, and wherein entries in the non-PII data sets and the anonymized PII data set are associated for a period of time by having a same index.

14. The system of claim 13, wherein the one-way hashing algorithm is applied with a rotating salt.

15. The system of claim 13, wherein applying the one or more filters from the one or more sticky tables comprises:

applying a first filter from a first sticky table to the PII data prior to storing the PII data in a raw PII data set, and applying a second filter from a second sticky table to the PII data stored in the raw PII data set.

16. The system of claim 15, wherein the one or more filters and the PII data are associated with subscriber identifiers, and wherein the one or more filters are applied to the PII data based on a subscriber identifier.

17. The system of claim 15, wherein the first filter comprises a plurality of student or minor exclusions, and wherein the second filter comprises at least one of aggregate reporting opt outs, corporate liable exclusions, or government exclusions.

* * * * *